US009405796B2

(12) United States Patent
Yacoub (10) Patent No.: US 9,405,796 B2
(45) Date of Patent: Aug. 2, 2016

(54) SYSTEMS AND METHODS FOR ANALYZING REGISTRAR AND HOSTING PROVIDER RELATIONSHIPS

(71) Applicant: VERISIGN, INC., Reston, VA (US)

(72) Inventor: Souheil Ben Yacoub, Fribourg (CH)

(73) Assignee: VERISIGN, INC., Reston, VA (US)

( * ) Notice: Subject to any disclaimer, the term of this patent is extended or adjusted under 35 U.S.C. 154(b) by 236 days.

(21) Appl. No.: 14/179,017

(22) Filed: Feb. 12, 2014

(65) Prior Publication Data

US 2015/0227581 A1 Aug. 13, 2015

(51) Int. Cl.
| | | |
|---|---|---|
| *G06F 15/173* | (2006.01) | |
| *G06F 17/30* | (2006.01) | |
| *G06Q 50/00* | (2012.01) | |
| *H04L 29/08* | (2006.01) | |
| *H04L 29/12* | (2006.01) | |

(52) U.S. Cl.
CPC .... *G06F 17/30424* (2013.01); *G06F 17/30598* (2013.01); *G06F 17/30958* (2013.01); *G06Q 50/01* (2013.01); *H04L 61/302* (2013.01); *H04L 61/1511* (2013.01); *H04L 61/2076* (2013.01); *H04L 61/3025* (2013.01); *H04L 67/10* (2013.01)

(58) Field of Classification Search
CPC ............... H04L 29/12066; H04L 29/12632; H04L 29/12641; H04L 61/1511; H04L 61/2076; H04L 61/302; H04L 61/3025
See application file for complete search history.

(56) References Cited

U.S. PATENT DOCUMENTS

| | | | |
|---|---|---|---|
| 6,336,138 B1 | 1/2002 | Caswell et al. | |
| 6,801,229 B1 * | 10/2004 | Tinkler | G06F 17/30991 345/440 |
| 7,216,123 B2 | 5/2007 | Kamvar et al. | |
| 7,562,304 B2 | 7/2009 | Dixon et al. | |
| 7,613,712 B2 | 11/2009 | Greenblatt et al. | |
| 7,877,432 B2 | 1/2011 | Maxson et al. | |
| 2006/0106847 A1 * | 5/2006 | Eckardt, III | G06F 17/30696 |
| 2006/0218303 A1 * | 9/2006 | Adelman | H04L 61/15 709/245 |
| 2009/0328224 A1 | 12/2009 | Hernacki et al. | |
| 2013/0085932 A1 * | 4/2013 | Waldron | H04L 61/1511 705/40 |
| 2014/0123108 A1 * | 5/2014 | Cheluvaraju | G06F 8/77 717/123 |

OTHER PUBLICATIONS

Berlt et al., "Modeling the Web as a Hypergraph to Compute Page Reputation", Information Systems, vol. 35, No. 5, Jul. 2010, pp. 530-543.

* cited by examiner

*Primary Examiner* — Patrice Winder
*Assistant Examiner* — Nam Tran
(74) *Attorney, Agent, or Firm* — MH2 Technology Law Group, LLP (57) ABSTRACT

Implementations of the present teachings relate to processes and systems for analyzing registrar and hosting provider relationships. In embodiments, the processes include compiling a list of domain names and matching each domain name with a registrar name and a hosting provider name. The processes also include generating a graph based on relationships between registrars and hosting providers. For example, the graph can represent the registrars and hosting providers as nodes and edges connecting the nodes can correspond to domain names that are registered by the registrar and hosted by the hosting provider. Further, the processes include applying graph metrics to the graph to identify key characteristics of a domain market.

24 Claims, 8 Drawing Sheets

Fig. 3A

| DOMAIN NAME | REGISTRAR | HOSTING PROVIDER |
|---|---|---|
| A.COM | X | X |
| B.COM | X | Y |
| C.COM | X | Z |
| D.COM | X | Z |
| E.COM | X | Z |

SYSTEMS AND METHODS FOR ANALYZING REGISTRAR AND HOSTING PROVIDER RELATIONSHIPS

FIELD

This disclosure relates generally to analysis of domain name registrar and website hosting provider relationships.

BACKGROUND

A key challenge for a domain name registry that operates with registrars is understanding the registrar's business network. Many domain name registrars operate through domain name resellers, which may also provide hosting services. The activities of resellers may be of interest to various parties, including the domain name registry. For example, large resellers may later become registrars and take their domain zone with them. However, information on resellers that may foretell such actions may not be readily available.

Accordingly, there is a need for methods and systems that can be utilized to provide insight based on registrar, registrant, hosting provider, and/or reseller relationships.

SUMMARY

Implementations of the present teachings relate to computer-implemented methods for analyzing registrar and hosting provider relationships. In various embodiments, the methods include receiving a list of domain names, determining registrar information and hosting provider information associated with each domain name of the list of domain names, and generating a registrar-to-hosting-provider graph based on the registrar information and the hosting provider information associated with each domain name. In some embodiments, the methods additionally include requesting the list of domain names.

In certain implementations, determining the registrar information and the hosting provider information associated with each domain name of the list of domain names can include querying domain name information services.

In further embodiments, the registrar-to-hosting-provider graph can use nodes to represent registrars and hosting providers and use edges that include at least one edge attribute that represents attributes of domains that are common between the registrars and the hosting providers. For example, the edge attributes can be a number of domain names of the list of domain names, where each edge represents at least one domain name associated with a registrar and a hosting provider.

In still further embodiments, the registrar-to-hosting provider graph can be a directed graph with the edges directed from the nodes representing the hosting providers to the nodes representing the registrars. Additionally, the edge attributes can be at least one of registrant information, name server information, expiration dates, registration dates, website traffic information, website type information, website language information, country information, and website content information.

In some embodiments, a betweenness centrality algorithm can be applied to the registrar-to-hosting-provider graph to determine one or more of a significant domain name registrar for a domain-specified market, a significant domain name reseller for a domain-specified market, and a significant hosting provider for a domain-specified market.

In other embodiments, a closeness centrality algorithm can be applied to the registrar-to-hosting-provider graph to determine a registrar/reseller network.

In further embodiments, a clustering algorithm can be applied to the registrar-to-hosting-provider graph to determine at least one of a registrar/reseller network and interconnected registrar/reseller networks.

In still further embodiments, an eigenvector centrality algorithm can be applied to the registrar-to-hosting-provider graph to determine a relative importance of a hosting provider's contribution to a registrar.

In other implementations, a wholesale hosting provider can be identified by calculating a high diversity value for edge attributes of edges between registrar nodes and a hosting provider node.

In further implementations, a domain name reseller can be identified by calculating a low diversity value for edge attributes of an edge(s) between a registrar node(s) and a hosting provider node.

In other embodiments, the registrar information and the hosting provider information can be determined for a first time interval, and then determined again for a different time interval(s). Accordingly, a registrar-to-hosting-provider graph can be generated for each time interval, and a user can be presented a visualization that includes a visualization of each registrar-to-hosting-provider graph.

Implementations of the present teachings relate to computer systems for analyzing domain registrar and hosting provider relationships. In embodiments, the systems include one or more memory devices storing instructions, and one or more processors coupled to the one or more memory devices. The one or more processors are configured to execute the instructions to perform methods and operations. The methods and operations include receiving a list of domain names, determining registrar information and hosting provider information associated with each domain name of the list of domain names, and generating a registrar-to-hosting-provider graph based on the registrar information and the hosting provider information associated with each domain name. In some embodiments, the methods and operations additionally include requesting the list of domain names.

Implementations of the present teachings also relate to computer readable storage media storing instructions. The instructions cause one or more processors to perform methods and operations for analyzing domain registrar and hosting provider relationships. The methods and operations include receiving a list of domain names, determining registrar information and hosting provider information associated with each domain name of the list of domain names, and generating a registrar-to-hosting-provider graph based on the registrar information and the hosting provider information associated with each domain name. In some embodiments, the methods and operations additionally include requesting the list of domain names.

BRIEF DESCRIPTION OF THE DRAWINGS

Various features of the implementations can be more fully appreciated, as the same become better understood with reference to the following detailed description of the implementations when considered in connection with the accompanying figures, in which.

DETAILED DESCRIPTION

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various implementations. Electrical, mechanical, logical and structural changes can be made to the examples of the various implementations without departing from the spirit and scope of the present teachings. The following detailed description is, therefore, not to be taken in a limiting sense and the scope of the present teachings is defined by the appended claims and their equivalents.

Figure 1:
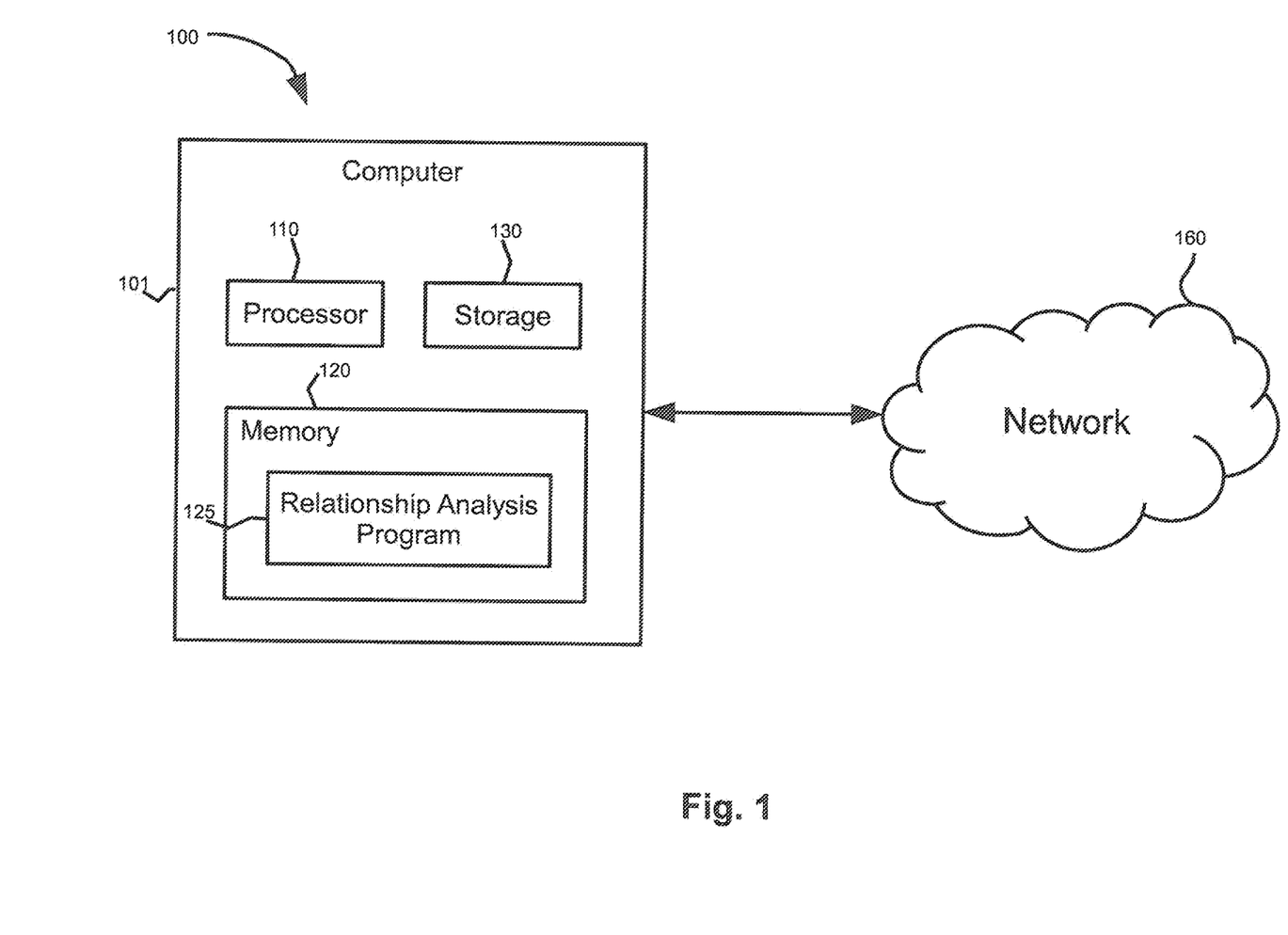
FIG. 1 is a diagram illustrating an exemplary system for analyzing registrar and hosting provider relationships, consistent with certain disclosed embodiments.

FIG. 1 is diagram illustrating an exemplary system 100 for graphing and analyzing registrar and hosting provider relationships. The exemplary system 100 includes exemplary system components that may be used. The components and arrangement, however, may be varied.

A computer 101 may include a processor 110, a memory 120, storage 130, and input/output (I/O) devices (not shown). The computer 101 may be implemented in various ways. For example, the computer 101 may be a general purpose computer, a server, a mainframe computer, any combination of these components, or any other appropriate computing device. The computer 101 may be standalone, or may be part of a subsystem, which may, in turn, be part of a larger system.

The processor 110 may include one or more known processing devices, such as a microprocessor from the Intel Core™ family manufactured by Intel™, the Phenom™ family manufactured by AMD™, or any of various processors manufactured by Sun Microsystems. Memory 120 may include one or more storage devices configured to store information used by processor 110 to perform certain functions related to disclosed embodiments. Storage 130 may include a volatile or non-volatile, magnetic, semiconductor, tape, optical, removable, non-removable, or other type of computer-readable medium used as a storage device.

In one embodiment, memory 120 may include one or more programs or subprograms that may be loaded from storage 130 or elsewhere that, when executed by the computer 101, perform various procedures, operations, methods, or processes consistent with disclosed embodiments. For example, memory 120 may include a relationship analysis program 125 for analyzing relationships between registrars and hosting providers. Memory 120 may also include other programs that perform other functions and processes, such as programs that provide communication support, Internet access, etc. The relationship analysis program 125 may be embodied as a single program, or alternatively, may include multiple subprograms that, when executed, operate together to perform the function of the relationship analysis program 125 according to disclosed embodiments.

The computer 101 may communicate over a link with a network 160. For example, the link may be a direct communication link, a LAN, a WAN, or other suitable connection. The network 160 may include the internet, as well as other systems.

The computer 101 may include one or more I/O devices (not shown) that allow data to be received and/or transmitted by the computer 101. I/O devices may also include one or more digital and/or analog communication input/output devices that allow the computer 101 to communicate with other machines and devices. I/O devices may also include input devices such as a keyboard or a mouse, and may include output devices such as a display or a printer. The computer 101 may receive data from external machines and devices and output data to external machines and devices via I/O devices. The configuration and number of input and/or output devices incorporated in I/O devices may vary as appropriate for various embodiments.

In embodiments, the computer 101 may also be communicatively connected to one or more data repositories (not shown).

Figure 2:
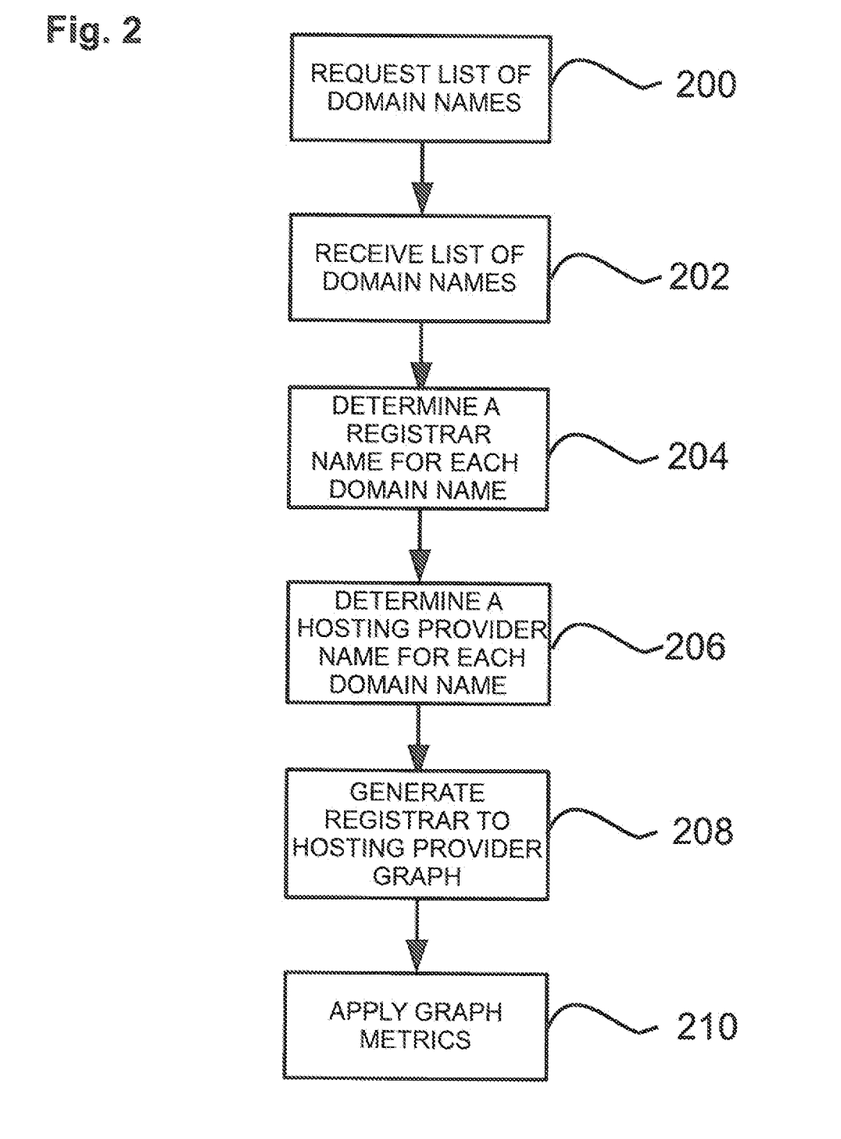
FIG. 2 is a flow diagram of an example of a process for analyzing registrar and hosting provider relationships, consistent with certain disclosed embodiments.

Exemplary uses of the system 100 can be described by way of example with reference to FIG. 2.

FIG. 2 is a flow diagram of an example of a process for analyzing registrar and hosting provider relationships, consistent with certain disclosed embodiments. In 200, the process can begin when the computer 101 requests a list of domain names. In embodiments, the computer 101 can request the list of domain names via the network 160. For example, the network 160 can be the internet, and the computer 101 can request the list of domain names from a remote database. In other embodiments, the computer 101 can maintain and access a local database of domain names and/or can access a database of domain names via a local area network. In still other embodiments, a search engine may be used to generate a list of domain names, for example, limited to domain names within one or more specified top level domains (TLD).

In some implementations, the computer 101 can further limit the search to a particular domain-specified market, e.g. a market that is defined or specified by a set of domains (e.g. one or more specified TLDs) and/or by a set of domain names (e.g., a group of the domain names that have a specified characteristic(s), such as a group of the top 25 domain names that had the most traffic during a specified time period). For example, the request for the list of domain names can include a search for domain names associated with websites in a particular language or to domain names that utilize a specified TLD used by a particular geographic location, such as a country code TLD (hereinafter, "ccTLD").

In 202, the computer 101 can receive the results of the request in 200. For example, the computer 101 can receive the results of a search for domain names associated with websites in a particular language and/or domain names that use a particular ccTLD. In some embodiments, the computer 101 can parse the results into a list of domain names and, in further embodiments, the computer 101 can receive the results as a list of domain names.

In 204, the computer 101 can determine a registrar for each domain name; e.g., identify the registrar through which a registrant registered a domain name. In some embodiments, the computer 101 can query a WHOIS server to determine a registrar name associated with each domain name. In further embodiments, the computer 101 can additionally or alternatively access one or more databases that store associations between domain names and registrar names and/or utilize one or more domain name information services. For example, the computer 101 can utilize a domain name information service such as the Internet Profile Service for Registrars (hereinafter, "IPS") provided by the Verisign® corporation.

In 206, the computer 101 can determine a hosting provider for each domain name; e.g., identify the hosting provider that provides hosting services for a website and/or the name server associated with a domain name. In some embodiments, the computer 101 can access one or more databases that store associations between domain names and hosting provider names and/or name servers and/or utilize one or more domain name information services. For example, the computer 101 can utilize a domain name information service such as the IPS provided by the Verisign® corporation. Some implementations of 206 may include analysis of the website for a domain name to determine the reseller and/or the hosting provider that hosts the website; e.g., that is associated with the domain name. For example, a reseller can be a web developer that includes name and/or contact information within a website, and the name and/or contact information can be identified during the analysis of the website.

In certain embodiments, a request for a registrar name and a request for a hosting provider name via one or more databases and/or domain name information services can be part of a single request. In further embodiments, the single request can also include queries for additional information that can be associated with a domain name. For example, the request can include queries for information associated with the domain name that includes: registrant information, name server information, expiration dates, registration dates, website traffic information, administrative contact information, technical contact information, billing contact information, website type information, website language information, country information, domain name reseller information, etc.

In 208, the computer 101 can generate a registrar-to-hosting-provider graph based on determined associations between domain names, registrars, and hosting providers. In various embodiments, the computer 101 can utilize software, systems, and/or providers of systems for graphing data to generate the registrar-to-hosting-provider graph. Additionally or alternatively, the computer 101 can generate graph data in various file formats, including Graph Modeling Language (GML), GraphML, etc. As used herein, a graph refers to a data structure and/or data model. In some embodiments, a visual representation of a graph can be displayed to a user, while, in further embodiments, a visual representation of a graph may not be utilized and relevant information can be extracted from the graph data structure.

In some embodiments, the registrar-to-hosting-provider graph can be created with nodes corresponding to registrars and/or hosting providers that are connected by edges corresponding to domain names that are both registered by the registrar and hosted by the hosting provider. In various embodiments described herein, a node (or vertex) represents the fundamental unit of which a graph data structure is formed and can include one or more data fields (e.g. a registrar name or a hosting provider name) as well as connections to other nodes (i.e. edges). In some embodiments, a visual representation of a node can be displayed as part of a visual representation of a graph (e.g. as a circle), while, in further embodiments, a visual representation of a node may not be utilized.

In additional embodiments described herein, an edge represents a connection between two nodes and can correspond to at least one domain name that is in common between the two nodes and/or one or more other edge attributes. Examples of edge attributes include, but are not limited to: number of domain names that are both registered by the registrar and hosted by the hosting provider, registration dates, website language information, registrant information, name server information, expiration dates, website traffic information, website type information, country information, and website content information. In some embodiments, a visual representation of an edge can be displayed as part of a visual representation of a graph (e.g. as a line), while, in further embodiments, a visual representation of an edge may not be utilized. In additional embodiments, the visual representation of an edge can be variable depending on the one more edge attributes. For example, the thickness of a visual representation representing an edge (e.g. a line) can be variable in proportion to the number of domain names that connect a registrar to a hosting provider.

The edge attributes can be used by the computer 101 and/or a user of the system to deduce, infer, or otherwise determine certain information about the registrars and/or hosting providers and/or the relationship between them. For example, consider implementations in which the edge attributes include or represent a web-developer signature parsed from the website content. In such implementations, the system may determine that hosting providers that are associated with many websites having the same or similar web-developer signatures provide hosting services and are resellers for one or more registrars.

In certain implementations, the computer 101 can generate a visualization of the registrar-to-hosting-provider graph using various available tools. The visualization can be in a human readable format and can be presented to a user via a display of the computer 101 for visual analysis.

As an example, multiple visualizations can be presented depicting registrar-to-hosting-provider graphs over select periods of time. Accordingly, hosting providers acting as resellers for a particular registrar could be identified and the relationship between the registrar and reseller could be tracked over time. Further, other trends in the graphs over time could be tracked and certain outcomes could be predicted. For example, a first visualization can represent a registrar-to-hosting-provider graph for a particular market for a first year, such as registrars and hosting providers for a particular country code top level domain (ccTLD) (e.g., ".de") for 2011. Additionally, a second visualization can represent a registrar-to-hosting provider graph for the same market for a second subsequent year, such as registrars and hosting providers for the same ccTLD for 2012. The two visualizations could be compared and changes to the registrar-to-hosting-provider graphs over the two years could be identified. Such changes can include, for example, increases in hosting activity over a period of time by a particular hosting provider. Accordingly, such increases in hosting activity could indicate that that hosting provider may soon become a registrar, among other things.

As a further example, multiple visualizations can be presented depicting different markets, such as domain-specified markets. For example, a first visualization can represent a registrar-to-hosting-provider graph for a first market, such as registrars and hosting providers for a first country code TLD. Additionally, a second visualization can represent a registrar-to-hosting provider graph for a second market, such as registrars and hosting providers for a second country code TLD. The multiple visualizations can be compared to determine overlapping registrars and/or hosting providers between the different markets, as well as identify highly active registrars and/or hosting providers for particular markets. For example, it may be determined that a particular registrar is a registrar for a large number of domains across multiple markets by comparing visualizations of registrar-to-hosting provider graphs for each market.

As another example, wholesale hosting providers can be distinguished from resellers by identifying hosting provider nodes with a large number of edge attributes in common with registrar nodes (e.g. domain names) and/or edge attributes identified by a diversity measure (e.g. entropy) as having a high diversity value as potential wholesale hosting providers and identify nodes with a small number of edge attributes in common with registrar nodes and/or edge attributes identified by a diversity measure as having a low diversity value as potential domain name resellers.

In embodiments, the computer 101 can apply graph metrics to the registrar-to-hosting-provider graph data structure in 210. Example graph metrics can include, but are not limited to: betweenness centrality; closeness centrality; eigenvector centrality; and clustering. Betweenness centrality can be used to measure how central a node is in a graph. Closeness centrality can be used to measure how independent a node or network of nodes are from the remainder of the graph. Eigenvector centrality can be used to measure value provided by a node to its direct environment. Clustering can be used to identify sets of nodes with high levels of interaction between each other compared to the remainder of the graph. As explained in further detail below, such graph metrics can be used to determine certain features of the market represented by a registrar-to-hosting-provider graph. For example, such graph metrics can be used to determine highly active registrars/hosting providers, domain name registrar-reseller networks, wholesale hosting providers, etc.

The graph metrics described herein are exemplary and additional types of graph metrics can be applied to the registrar-to-hosting-provider graph data structure to measure various node values and/or make various determinations regarding nodes, networks of nodes, etc. Additionally, various graph metrics and other processes and/or methods described herein may utilize parameters that are manually input or selected heuristically by attempting and evaluating various parameter combinations.

While FIG. 2 illustrates various processes and stages that can be performed by the computer 101, any of the processes and stages of the processes can be performed by any type of one or more computing devices. Likewise, the illustrated stages of the processes are examples and any of the illustrated stages can be removed, additional stages can be added, and the order of the illustrated stages can be changed. For example, in embodiments, the computer 101 can determine a hosting provider name for each domain name before, after, or concurrently with determining a registrar name for each domain name. As an additional example, in further embodiments, the computer 101 may not apply graph metrics in 210, and can instead present a visualization of the graph to a user for a visual analysis.

In the example registrar and hosting provider relationship graphs described above, nodes are connected based on being associated with a common domain name. However, in additional embodiments, the nodes can also be connected based on additional information. For example, a registrar and hosting provider relationship graph can depict registrars and hosting providers as nodes connected by edges with edge attributes that indicate information such as: websites that were updated within a selected time period; domain names that were renewed within a selected time period; a transfer from one hosting provider to another; etc.

Figure 3A:
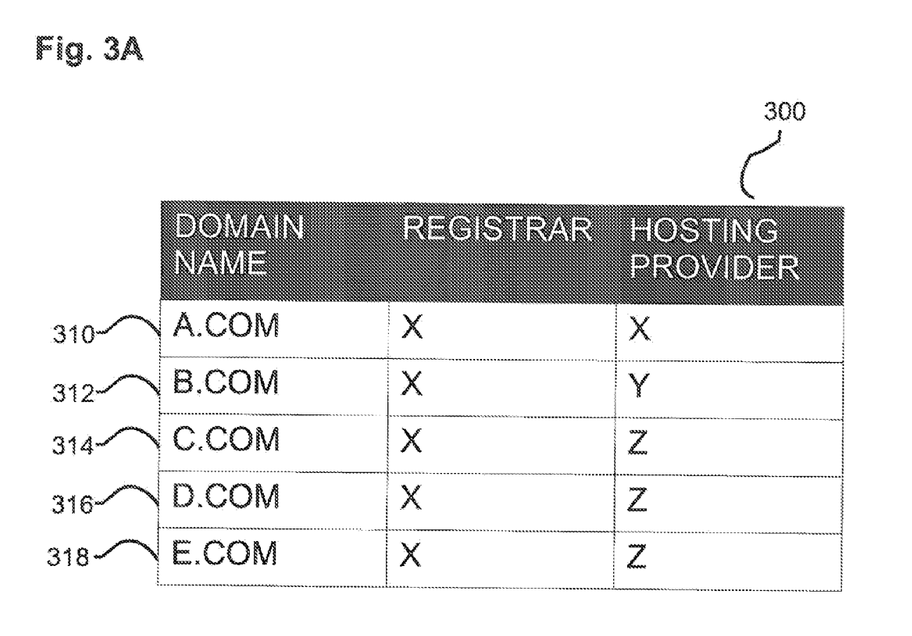
FIG. 3A is a diagram illustrating an exemplary list of domain names associated with registrar and hosting provider information, consistent with certain disclosed embodiments.

FIG. 3A is a diagram illustrating an exemplary list of domain names associated with registrar and hosting provider information, consistent with certain disclosed embodiments. The exemplary list of domain names is presented in FIG. 3A as a table 300, however, such a presentation is merely for the purpose of illustration and is not intended to be limiting.

In embodiments, the computer 101 can request a list of domain names, for example, by accessing a database of domain names via a local area network. For the purposes of the example depicted in FIG. 3A, it can be assumed that five domains were returned as a result of the request. The five domains are listed in the table 300.

The computer 101 can query one or more databases or use one or more domain name information services to determine registrar information and hosting provider information for each of the five domain names. As shown in the table 300, the computer 101 can receive responses to the queries and associate registrar information and hosting provider information with each of the five domain names.

In the example depicted in FIG. 3A: in row 310, the domain name A.COM is associated with registrar X and hosting provider X; in row 312, the domain name B.COM is associated with registrar X and hosting provider Y; in row 314, the domain name C.COM is associated with registrar X and hosting provider Z; in row 316, the domain name D.COM is associated with registrar X and hosting provider Z; in row 318, the domain name E.COM is associated with registrar X and hosting provider Z.

The example list of domain names depicted in FIG. 3A is merely for illustrative purposes and is simplified for the purpose of the illustration. Accordingly, the list of domain names, the table 300, and the registrar and hosting provider information are not intended to be limiting. Implementations of the disclosed systems and methods can, for example, use lists of different sizes, may not represent the information as a table, and/or can provide less or more information relative to the domain names, consistent with certain disclosed embodiments.

Figure 3B:
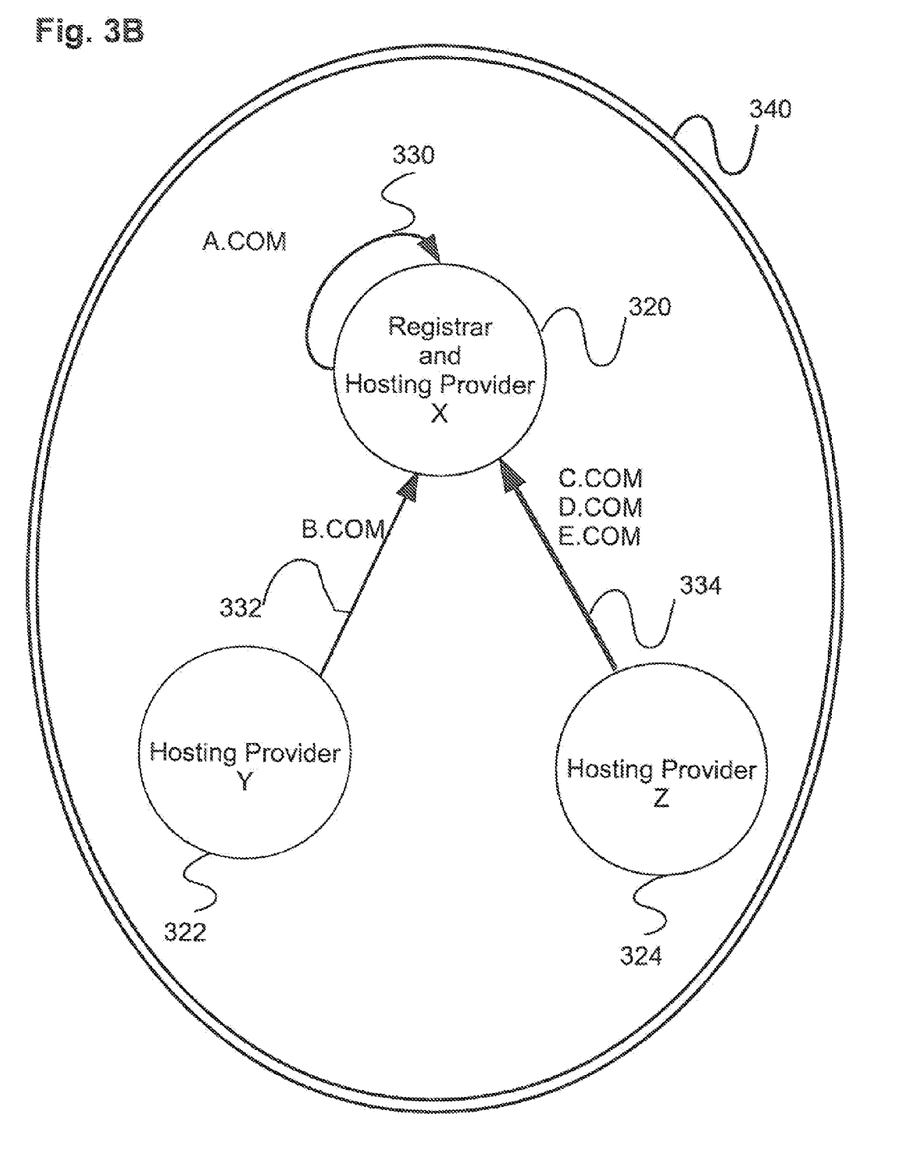
FIG. 3B is a diagram illustrating an exemplary registrar-to-hosting-provider graph, consistent with certain disclosed embodiments.

FIG. 3B is a diagram illustrating an exemplary registrar-to-hosting-provider graph, consistent with certain disclosed embodiments. The exemplary graph depicts a possible visualization of the list of domain names shown in the table 300. However, such a visualization is merely for the purpose of illustrating a graph data structure and is not intended to be limiting. As stated above, various embodiments may be implemented without generating graph visualizations. Additionally, although the graph 340 is depicted with directed edges directed from hosting providers and/or reseller nodes towards registrar nodes, various orientations of directed edges, non-directed edges, and nodes can be utilized. For example, embodiments can create visualizations with directed edges directed from registrar nodes towards hosting provider and/or reseller nodes. Additional visualizations and graph structures may be used, consistent with disclosed embodiments.

The computer 101 can generate the graph 340 depicted in FIG. 3B based on determined associations between the domain names, registrar information, and hosting provider information depicted in the table 300. In embodiments, the computer 101 can utilize software, systems, and/or providers of systems for graphing data to generate the graph 340. Additionally or alternatively, the computer 101 can generate graph data in various file formats, including GML, GraphML, etc.

In the graph 340, the registrars and hosting providers are depicted as nodes connected by edges corresponding to domain names that are both registered by the registrar and hosted by the hosting provider. Registrar X, (which is also a hosting provider in this example), is depicted as node 320, hosting provider Y is depicted as node 322, and hosting provider Z is depicted as node 324. Domain name A.COM is depicted as directed edge 330, domain name B.COM is depicted as directed edge 332, and domain names C.COM, D.COM, and E.COM are depicted as directed edge 334. As depicted in FIG. 3B, the thickness of the edge is for visualization purposes and, for the purposes of this example, corresponds to the number of domain names connecting a hosting provider to a registrar.

As further depicted in FIG. 3B, node 320 is connected to itself by directed edge 330. Directed edge 330 indicates that X is both the registrar and hosting provider for A.COM. Node 322 is connected by directed edge 332 to node 320. Directed edge 332 indicates that X is the registrar for B.COM and Y is the hosting provider for B.COM. Node 324 is connected by directed edge 334 to node 320. Directed edge 334 indicates that X is the registrar for C.COM, D.COM, and E.COM and Z is the hosting provider for C.COM, D.COM, and E.COM. In the example shown, the directed edge 334 is approximately three times thicker than the directed edge 332, which represents, for the purposes of this example, that the hosting provider Z (node 324) and the registrar X (node 320) have three times as many domain names in common as do the hosting provider Y (node 322) and the registrar X (node 320). In other implementations, each of the domain names C.COM, D.COM, and E.COM may be represented with separate edges, (three edges in this example), which is another way to graphically represent the number of domain names associated with both the hosting provider Z (node 324) and the registrar X (node 320). In further embodiments, a visual representation of graph, the nodes, and the edges may not be utilized.

In embodiments, the computer 101 can apply graph metrics to the graph 340. In further embodiments, the graph 340 can be presented visually to a user for analysis. Based on the graph 340, the computer 101 and/or the user can make various determinations. For example, in some embodiments, the computer 101 can use a rules engine (for example, implemented in software executing on computer 101), which performs calculations and determinations. Using the rules engine, computer 101 can determine that X is a registrar based on X being used as a registrar for a number of domain names that exceeds a predetermined threshold number. The computer 101 can also determine, for example, using the rules engine, that A.COM is likely using a hosting service provided by registrar X based on X being used as both a registrar and hosting provider for A.COM. The computer 101 can additionally determine, for example, using the rules engine, that B.COM is likely using its own hosting infrastructure/self-hosting based on Y being used as a hosting provider for only one domain name. The computer 101 can also determine, for example, using the rules engine, that Z is likely a domain name reseller for registrar X based on Z being used as a hosting provider by a number of domain names that use registrar X as a registrar that exceeds a predetermined threshold number. Additional determinations can be made using, for example, other edge attributes, consistent with certain disclosed embodiments.

The graph 340 depicted in FIG. 3B is merely for illustrative purposes and is simplified for the purpose of the illustration. Accordingly, the presentation of nodes and edges is not intended to be limiting. Implementations of the disclosed systems and methods can, for example, use different graph styles, may not visually depict the graphs, may include different numbers of nodes and edges, etc.

Figure 4A:
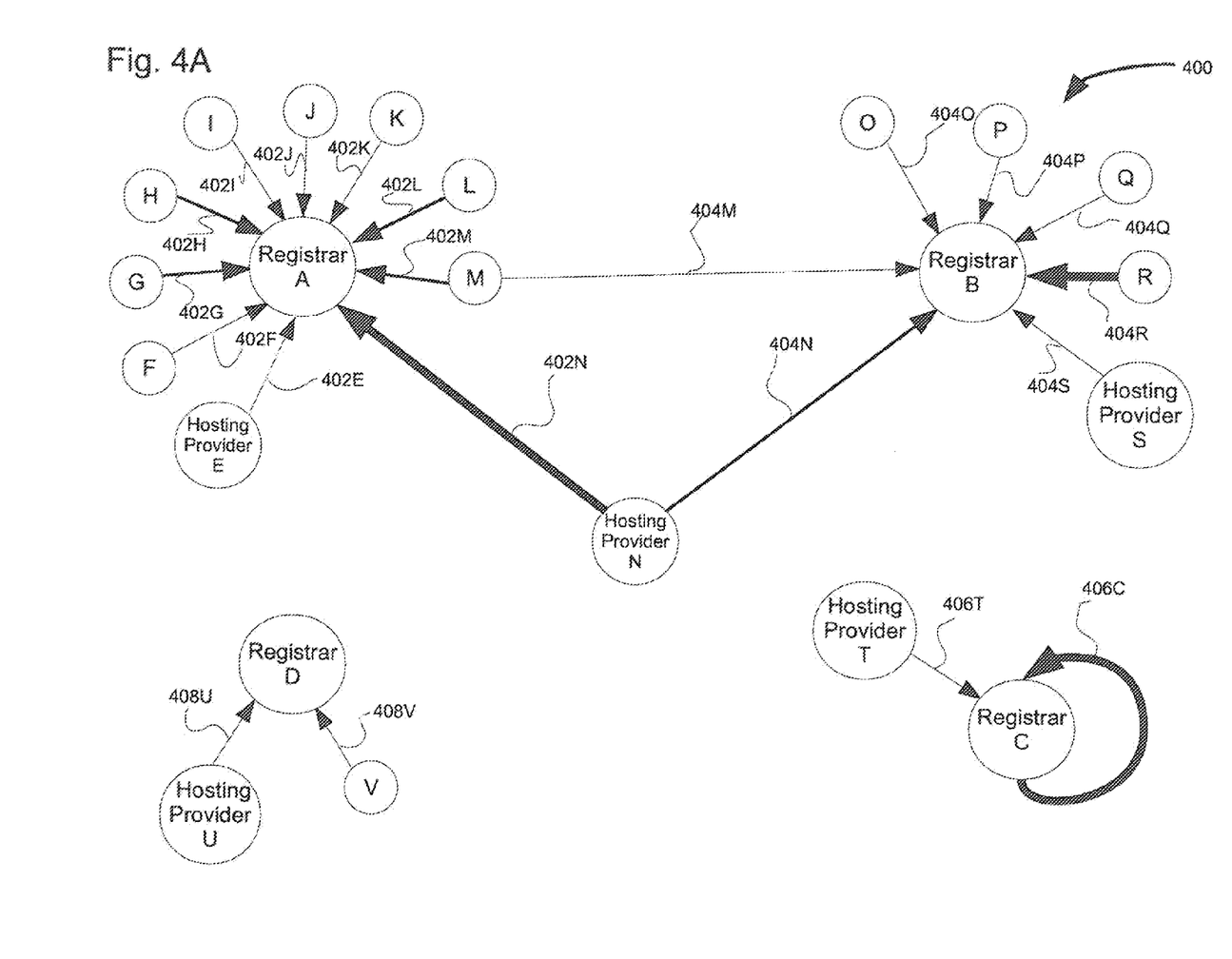
FIG. 4A is a diagram illustrating an exemplary registrar-to-hosting-provider graph, consistent with certain disclosed embodiments.

FIG. 4A is a diagram illustrating an exemplary registrar-to-hosting-provider graph, consistent with certain disclosed embodiments. The graph 400 depicts a possible visualization of a list of domain names with registrar and hosting provider information. However, such a visualization is merely for the purpose of illustrating a graph data structure and is not intended to be limiting. As stated above, various embodiments may be implemented without generating graph visualizations The computer 101 can generate the graph 400 based on determined associations between a list of domain names, registrar information, and hosting provider information. In embodiments, the computer 101 can utilize software, systems, and/or providers of systems for graphing data to generate the graph 400. Additionally or alternatively, the computer 101 can generate graph data in various file formats, including GML, GraphML, etc.

In the graph 400, the registrars and hosting providers are depicted as nodes connected by edges corresponding to the domain name(s) in common between each registrar and hosting provider. The thickness of the edge is for visualization purposes and, for the purposes of this example, can correspond to the number of domain names connecting a hosting provider to a registrar. In other embodiments, the thickness of an edge may represent the quantity of another attribute(s) of a domain(s) that two nodes have in common. For example, the thickness of an edge may represent a number of French domain names that are common between a registrar and a hosting provider/reseller.

Node A can represent a registrar for domain names associated with websites hosted by nodes E, F, G, H, I, J, K, L, M, and N. The thin directed edges 402E, 402F, 402I, 402J, and 402K from nodes E, F, I, J, and K, respectively, to node A represent relatively few domain names. For example, a thin directed edge can represent less than ten domain names connecting the hosting provider to the registrar (e.g., less than ten domain names both hosted by the hosting provider and registered by the registrar). The thicker directed edges 402G, 402H, 402L, and 402M from nodes G, H, L, and M, respectively, to node A can represent a relatively greater number of domain names. For example, a directed edge of relatively medium thickness can represent between ten and 100 domain names connecting the hosting provider to the registrar. The thickest directed edges, such as directed edge 402N from node N to node A, can represent a large number of domain names. For example, a thick directed edge can represent 100 or more domain names connecting the hosting provider to the registrar.

Based on the number of domain names associated with the edges connected to node A, a computerized implementation consistent with this disclosure may categorize or otherwise determine, for example, using the rules engine, that the hosting providers represented by nodes G, H, L, M, and N are resellers for the registrar represented by node A. Based on their lack of connections to other registrar nodes, such a computerized implementation may also categorize or otherwise determine that the hosting providers represented by nodes G, H, and L, have a dedicated reseller arrangement with the registrar represented by node A.

Node B can represent a registrar for domain names associated with websites hosted by nodes O, P, Q, R, S, M, and N. The thin directed edges 404M, 404O, 404P, 404Q, and 404S from nodes M, O, P, Q, and S, respectively, to node B can represent relatively few domain names. The medium-thickness directed edge 404N from node N to node B can represent a relatively medium number of domain names. The thick directed edge 404R from node R to node B can represent a relatively large number of domain names.

Based on the number of domain names associated with the edges connected to node B or a measure derived from the number of domain names (e.g. a logarithmic scale where the measure is Log(Number of Domain Names)), a computerized implementation consistent with this disclosure may categorize or otherwise determine, for example, using the rules engine, that the hosting provider represented by node R is the most important reseller for the registrar represented by node B.

Node C can represent a registrar for domain names associated with websites hosted by nodes C and T. The thin directed edge 406T from node T to node C can represent relatively few domain names. The thick directed edge 406C from node C to itself can represent a large number of domain names. Based on the number of domain names associated with the edges connected to node C or a measure derived from the number of domain names, as well as the sparseness, and self-connectedness of the edges connecting to node C, a computerized implementation consistent with this disclosure may categorize or otherwise determine that the registrar represented by node C is a company that hosts and registers its own websites, and that being a registrar or hosting provider is not its primary line of business.

Node D can represent a registrar for domain names associated with websites hosted by nodes U and V. The thin directed edges 408U and 408V from nodes U and V, respectively, to node D can represent relatively few domain names. Based on the relatively low number of domain names associated with the edges connected to node D and sparseness of the edges connected to node D, a computerized implementation consistent with this disclosure may categorize or otherwise determine that the registrar represented by node D is a registrar with low activity, such as, for example, a new registrar, an unsuccessful registrar, a registrar that is a small part of a larger business (e.g. intellectual property protection), etc.

The example graph depicted in FIG. 4A is merely for illustrative purposes and is simplified for the purpose of the illustration. Accordingly, the presentation of nodes and edges is not intended to be limiting. Implementations of the disclosed systems and methods can, for example, use different graph styles, may not visually depict the graphs, may include different numbers of nodes and edges, may use other edge attributes as the basis for connecting nodes, etc.

Figure 4B:
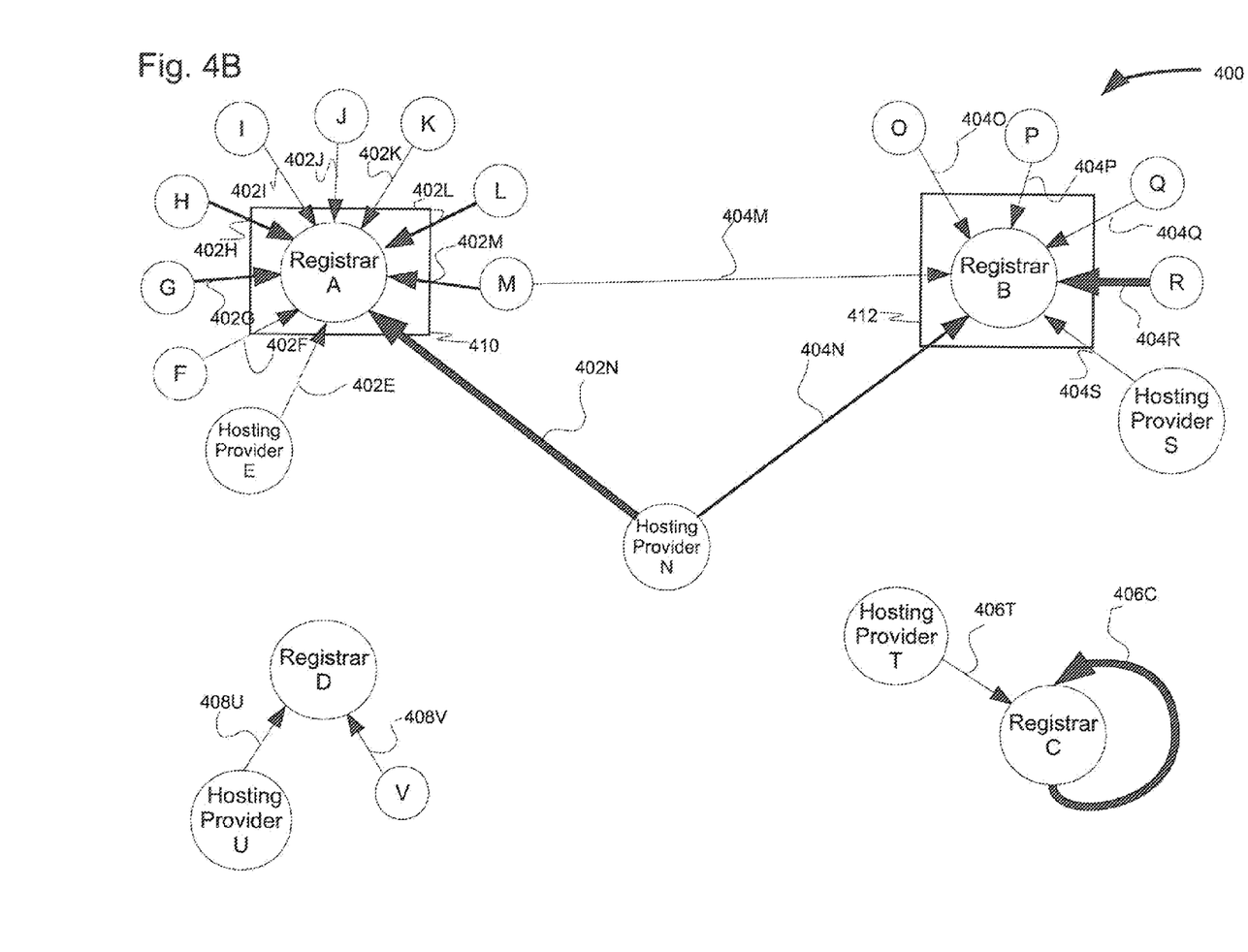
FIG. 4B is a diagram illustrating an exemplary registrar-to-hosting-provider graph, consistent with certain disclosed embodiments.

FIG. 4B is a diagram illustrating an exemplary registrar-to-hosting-provider graph, consistent with certain disclosed embodiments. In embodiments, the computer 101 can apply graph metrics to the graph data structure described above, which is visualized as the graph 400 depicted in FIG. 4A. For example, the computer 101 can calculate betweenness centrality for the nodes.

Betweenness centrality can be calculated for each node by computing the number of shortest paths between each of the other nodes that pass through the node. In embodiments, betweenness centrality can be used to determine the importance of a node in the graph. Important nodes can represent, for example, large, market-dominant, or otherwise significant domain name registrars for a domain name market (e.g., for a market specified by a set of domain names, or specified by a specific TLD, or the like), large, market-dominant, or otherwise significant domain name resellers for a domain name market, large, market-dominant, or otherwise significant hosting providers for a domain-specified market, etc.

For example, using a betweenness centrality algorithm, the computer 101 can determine that node A in box 410 and node B in box 412 have relatively high betweenness centrality compared to the other nodes. Accordingly, node A and node B may be important nodes for a set of domain names. Such a determination can indicate that nodes A and B are relatively large and/or active registrars for the set of domain names. In embodiments, nodes A and B can be identified as large registrars and/or registrars that have a high impact, high importance, and/or generate a large amount of income in a particular market. Similar identifications or determinations can be made for hosting provider nodes that exhibit a relatively high betweenness centrality.

The example graph and boxes depicted in FIG. 4B are merely for illustrative purposes and are simplified for the purpose of the illustration. Accordingly, the presentation of nodes and edges and identification of nodes with high betweenness centrality are not intended to be limiting. Implementations of the disclosed systems and methods can, for example, use different graph styles, may not visually depict the graphs, may include different numbers of nodes and edges, may identify more or less nodes of high importance/activity, may identify different nodes, etc.

Figure 4C:
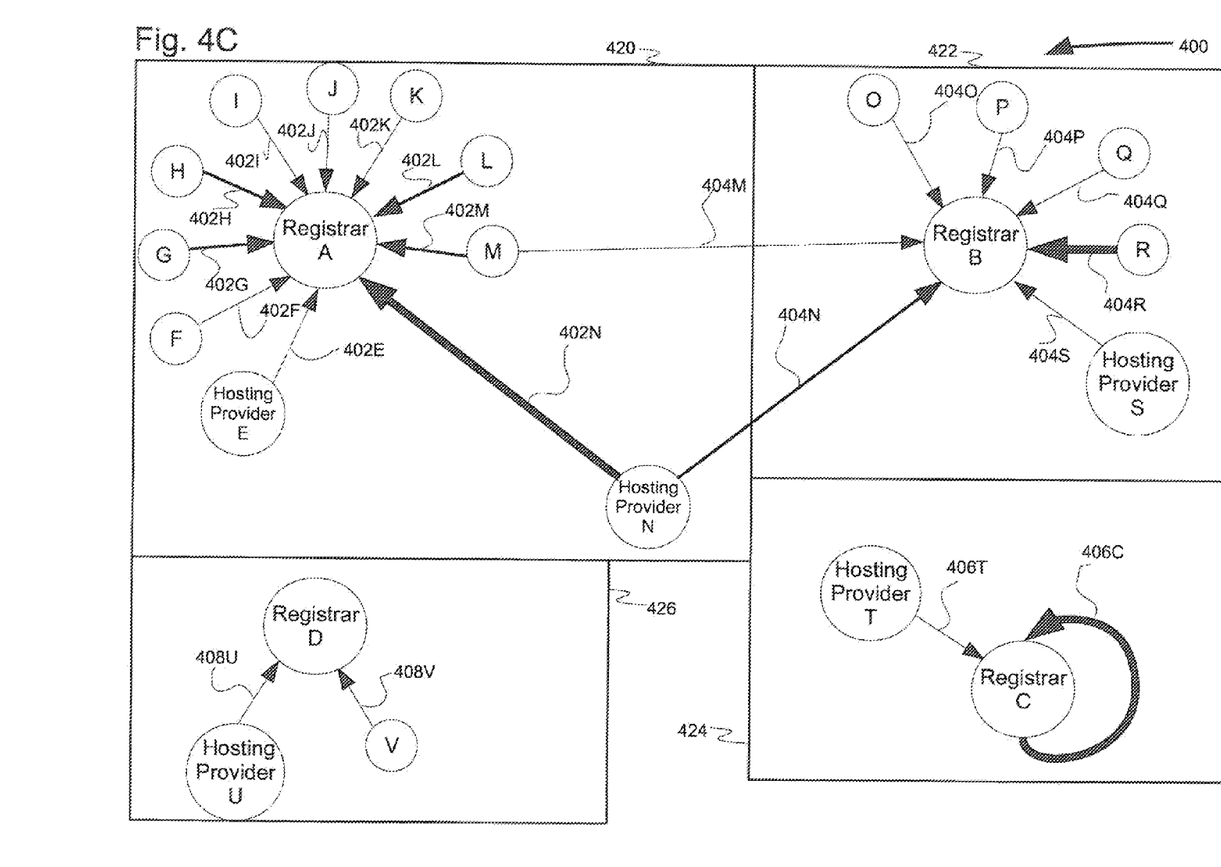
FIG. 4C is a diagram illustrating an exemplary registrar-to-hosting-provider graph, consistent with certain disclosed embodiments.

FIG. 4C is a diagram illustrating an exemplary registrar-to-hosting-provider graph, consistent with certain disclosed embodiments. In embodiments, the computer 101 can apply graph metrics to the graph data structure described above, which is visualized as the graph 400 depicted in FIG. 4A. For example, the computer 101 can calculate closeness centrality for the nodes and/or cluster the nodes.

Closeness centrality can be calculated for each node and/or set of nodes by computing the shortest number of steps between the node and/or set of nodes and every other node and/or set of nodes. In embodiments, closeness centrality can be used to determine independence of a node or a set of nodes in the graph. Such a determination can indicate that, for example, a set of nodes represents a registrar/reseller network.

For example, using a closeness centrality algorithm, the computer 101 can determine that nodes A, E, F, G, H, I, J, K, L, M, and N in box 420 are relatively independent from the other nodes and/or sets of nodes based on a closeness centrality calculation. In the embodiment shown, nodes E, F, G, H, I, J, K, and L can be included in box 420 because each node is only connected to node A, while nodes M and N can be included in box 420 because the directed edges connecting nodes M and N to node A are associated with a larger number of domain names connecting the nodes (i.e. are thicker in the visual representation) than the directed edges connecting nodes M and N to node B.

Moreover, the computer 101 can determine that nodes B, O, P, Q, R, and S in box 422 are relatively independent from the other nodes and/or sets of nodes based on a closeness centrality calculation. Additionally, the computer 101 can determine that nodes C and T in box 424 are relatively independent from the other nodes and/or sets of nodes based on a closeness centrality calculation. Further, the computer 101 can determine that nodes D, U, and V in box 426 are relatively independent from the other nodes and/or sets of nodes based on a closeness centrality calculation.

Accordingly, based on such determinations, registrar-reseller networks can be detected and identified. For example, the nodes in boxes 420 and 422 can be identified as part of large registrar-reseller networks.

Similarly, clustering can performed using the graph 400 and, in embodiments, registrar-reseller networks can be similarly detected and identified using clustering algorithms. In some embodiments, higher level clustering can be performed on sets of nodes. For example, boxes 420 and 422 can be grouped together using clustering based on connections through nodes M and N, and boxes 420 and 422 can be identified as interconnected registrar/reseller networks The example graph and boxes depicted in FIG. 4C are merely for illustrative purposes and are simplified for the purpose of the illustration. Accordingly, the presentation of nodes and edges and identification of nodes based on closeness centrality and/or clustering are not intended to be limiting. Implementations of the disclosed systems and methods can, for example, use different graph styles, may not visually depict the graphs, may include different numbers of nodes and edges, may identify more or less node groups, may identify different node groups, etc.

Figure 4D:
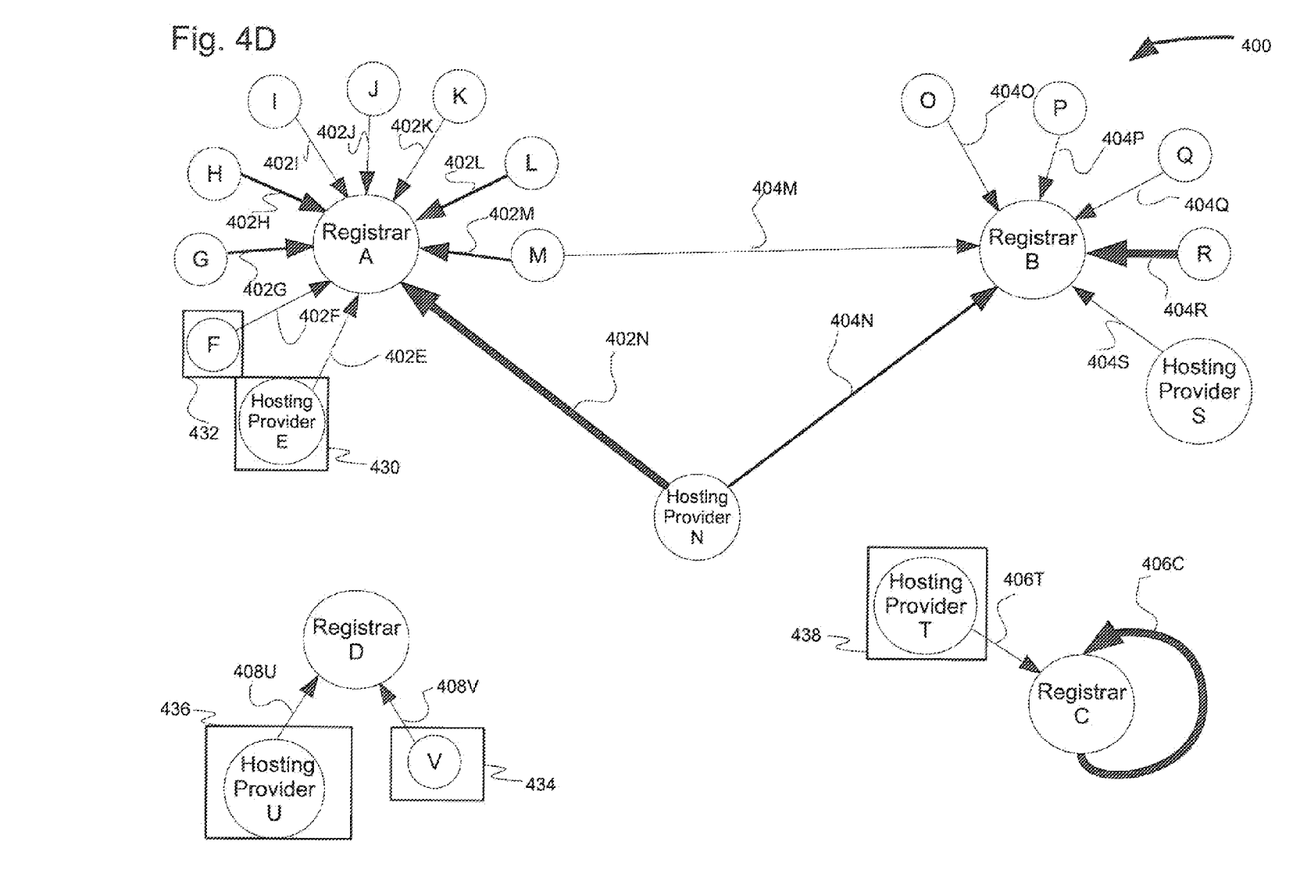
FIG. 4D is a diagram illustrating an exemplary registrar-to-hosting-provider graph, consistent with certain disclosed embodiments.

FIG. 4D is a diagram illustrating an exemplary registrar-to-hosting-provider graph, consistent with certain disclosed embodiments. In embodiments, the computer 101 can apply graph metrics to the graph data structure described above, which is visualized as the graph 400 depicted in FIG. 4A. For example, the computer 101 can calculate eigenvector centrality for the nodes.

Eigenvector centrality can be calculated for each node by computing scores for a node based on the number of connections to that node, where connections to higher scoring nodes are weighted higher than connections to lower scoring nodes. In some embodiments, the initial scores for each node can be computed in one iteration once the graph is defined. In embodiments, eigenvector centrality can be used to find the relative importance of a hosting provider's contribution to a registrar.

For example, using an eigenvector centrality algorithm, the computer 101 can determine that nodes E and F in boxes 430 and 432 received higher eigenvector centrality scores compared to nodes U, V, and T in boxes 434, 436, and 438. Nodes E and F may have received higher eigenvector centrality scores based on connections to node A. Node A may have a high eigenvector centrality score based on a large number of connections to a higher number of nodes. Nodes U, V, and T may have received lower eigenvector centrality scores based on only being connected to nodes with lower eigenvector centrality scores (nodes D and C). Nodes D and C may have lower eigenvector centrality scores based on having a low number of connections to a low number of other nodes.

Accordingly, even if nodes E, F, T, U, and V have similar numbers of connections to other nodes, because nodes E and F have higher eigenvector centrality scores it may be determined that nodes E and F have different roles than nodes T, U, and V. For example, the higher eigenvector centrality score of nodes E and F can indicate that these nodes likely are small resellers for registrar A, while the lower eigenvector centrality scores of nodes T, U, and V may indicate that these nodes are likely to be single registrants that are self-hosting websites rather than resellers.

The example graph and boxes depicted in FIG. 4D are merely for illustrative purposes and are simplified for the purpose of the illustration. Accordingly, the presentation of nodes and edges and identification of nodes based on eigenvector centrality are not intended to be limiting. Implementations of the disclosed systems and methods can, for example, use different graph styles, may not visually depict the graphs, may include different numbers of nodes and edges, etc.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the method of FIG. 2 has been described with a particular example, the steps or operations of the method may be performed in a different order than illustrated or simultaneously. Furthermore, to the extent that the terms "including", "includes", "having", "has", "with", or variants thereof are used, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "zero or more." Those skilled in the art will recognize that these and other variations are possible within the spirit and scope as defined in the following claims and their equivalents.

What is claimed is:

1. A computer-implemented method for analyzing domain name registrar and hosting provider relationships, the method comprising:
   receiving a list of domain names;
   determining registrar information and hosting provider information associated with each domain name of the list of domain names; and
   generating a registrar-to-hosting-provider graph based on the registrar information and the hosting provider information associated with each domain name, wherein:
      the registrar-to-hosting-provider graph comprises:
         nodes representing registrars and nodes representing hosting providers; and
         edges comprising one or more edge attributes representing one or more common associations between the registrars and the hosting providers;
      the one or more edge attributes comprise a number of domain names of the list of domain names; and
      each edge corresponds to at least one domain name associated with a registrar and a hosting provider.

2. The method of claim 1, further comprising:
   requesting the list of domain names.

3. The method of claim 1, wherein determining the registrar information and the hosting provider information associated with each domain name of the list of domain names comprises:
   querying one or more domain name information services.

4. The method of claim 1, wherein the registrar-to-hosting-provider graph is a directed graph with the edges directed from the nodes representing the hosting providers to the nodes representing the registrars.

5. The method of claim 4, wherein the one or more edge attributes comprise:
   at least one from a group consisting of registrant information, name server information, expiration dates, registration dates, website traffic information, website type information, website language information, country information, and website content information.

6. The method of claim 1, further comprising:
   applying a betweenness centrality algorithm to the registrar-to-hosting-provider graph to determine one or more of a significant domain name registrar for a domain-specified market, a significant domain name reseller for a domain-specified market, and a significant hosting provider for a domain-specified market.

7. The method of claim 1, further comprising:
applying a closeness centrality algorithm to the registrar-to-hosting-provider graph to determine a registrar/reseller network.

8. The method of claim 1, further comprising:
applying a clustering algorithm to the registrar-to-hosting-provider graph to determine at least one from a group consisting of a registrar/reseller network and interconnected registrar/reseller networks.

9. The method of claim 1, further comprising:
applying an eigenvector centrality algorithm to the registrar-to-hosting-provider graph to determine a relative importance of a hosting provider's contribution to a registrar.

10. The method of claim 1, further comprising:
identifying a wholesale hosting provider by calculating a high diversity value for edge attributes of a plurality of edges between a plurality of registrar nodes and a hosting provider node.

11. The method of claim 1, further comprising:
identifying a domain name reseller by calculating a low diversity value for edge attributes of at least one edge between at least one registrar node and a hosting provider node.

12. The method of claim 1, wherein determining the registrar information and the hosting provider information comprises determining the registrar information and hosting provider information corresponding to a first period of time, the method further comprising:
determining registrar information and hosting provider information corresponding to a second period of time;
generating a second registrar-to-hosting-provider graph based on the registrar information and the hosting provider information corresponding to the second period of time; and
presenting a visualization that comprises a visualization of the registrar-to-hosting-provider graph and a visualization of the second registrar-to-hosting-provider graph.

13. A system for analyzing domain name registrar and hosting provider relationships, the system comprising:
one or more memory devices storing instructions; and
one or more processors coupled to the one or more memory devices and configured to execute the instructions to perform operations comprising:
 receiving a list of domain names;
 determining registrar information and hosting provider information associated with each domain name of the list of domain names; and
 generating a registrar-to-hosting-provider graph based on the registrar information and the hosting provider information associated with each domain name, wherein:
  the registrar-to-hosting-provider graph comprises:
   nodes representing registrars and nodes representing hosting providers; and
   edges comprising one or more edge attributes representing one or more common associations between the registrars and the hosting providers;
  the one or more edge attributes comprise a number of domain names of the list of domain names; and
  each edge corresponds to at least one domain name associated with a registrar and a hosting provider.

14. The system of claim 13, wherein the operations further comprise:
requesting the list of domain names.

15. The system of claim 13, wherein determining the registrar information and the hosting provider information associated with each domain name of the list of domain names comprises:
querying one or more domain name information services.

16. The system of claim 13, wherein the registrar-to-hosting-provider graph is a directed graph with the edges directed from the nodes representing the hosting providers to the nodes representing the registrars.

17. The system of claim 16, wherein the one or more edge attributes comprise:
at least one from a group consisting of registrant information, name server information, expiration dates, registration dates, website traffic information, website type information, website language information, country information, and website content information.

18. The system of claim 13, wherein the operations further comprise:
applying a betweenness centrality algorithm to the registrar-to-hosting-provider graph to determine one or more of a significant domain name registrar for a domain-specified market, a significant domain name reseller for a domain-specified market, and a significant hosting provider for a domain-specified market.

19. The system of claim 13, wherein the operations further comprise:
applying a closeness centrality algorithm to the registrar-to-hosting-provider graph to determine a registrar/reseller network.

20. The system of claim 13, wherein the operations further comprise:
applying a clustering algorithm to the registrar-to-hosting-provider graph to determine at least one from a group consisting of a registrar/reseller network and interconnected registrar/reseller networks.

21. The system of claim 13, wherein the operations further comprise:
applying an eigenvector centrality algorithm to the registrar-to-hosting-provider graph to determine a relative importance of a hosting provider's contribution to a registrar.

22. The system of claim 13, wherein the operations further comprise:
identifying a wholesale hosting provider by calculating a high diversity value for edge attributes of a plurality of edges between a plurality of registrar nodes and a hosting provider node.

23. The system of claim 13, wherein the operations further comprise:
identifying a domain name reseller by calculating a low diversity value for edge attributes of at least one edge between at least one registrar node and a hosting provider node.

24. The system of claim 13, wherein determining the registrar information and the hosting provider information comprises determining the registrar information and hosting provider information corresponding to a first period of time, the operations further comprising:
determining registrar information and hosting provider information corresponding to a second period of time;
generating a second registrar-to-hosting-provider graph based on the registrar information and the hosting provider information corresponding to the second period of time; and presenting a visualization that comprises a visualization of the registrar-to-hosting provider graph and a visualization of the second registrar-to-hosting-provider graph.

\* \* \* \* \*